United States Patent
Greasley et al.

(10) Patent No.: US 12,094,019 B1
(45) Date of Patent: Sep. 17, 2024

(54) ELECTRONIC ASSET MANAGEMENT

(71) Applicant: Apple Inc., Cupertino, CA (US)

(72) Inventors: Jack R. Greasley, San Francisco, CA (US); Daniel Ulbricht, Sunnyvale, CA (US); Eshan Verma, Mountain View, CA (US)

(73) Assignee: Apple Inc., Cupertino, CA (US)

(*) Notice: Subject to any disclaimer, the term of this patent is extended or adjusted under 35 U.S.C. 154(b) by 244 days.

(21) Appl. No.: 16/944,812

(22) Filed: Jul. 31, 2020

Related U.S. Application Data

(60) Provisional application No. 62/881,613, filed on Aug. 1, 2019.

(51) Int. Cl.
*G06Q 50/18* (2012.01)
*G06F 16/23* (2019.01)

(52) U.S. Cl.
CPC ........... *G06Q 50/184* (2013.01); *G06F 16/23* (2019.01)

(58) Field of Classification Search
None
See application file for complete search history.

(56) References Cited

U.S. PATENT DOCUMENTS

| | | | |
|---|---|---|---|
| 9,177,225 B1* | 11/2015 | Cordova-Diba | G06V 10/42 |
| 10,223,438 B1 | 3/2019 | Xu et al. | |
| 2008/0235104 A1* | 9/2008 | Chow | G06Q 30/0633 |
| | | | 705/40 |
| 2011/0161054 A1* | 6/2011 | Woolf | G06F 17/00 |
| | | | 703/1 |
| 2013/0322733 A1* | 12/2013 | Tarnowski | G06F 18/40 |
| | | | 382/141 |

FOREIGN PATENT DOCUMENTS

| | | | | |
|---|---|---|---|---|
| WO | WO-2016004330 A1 * | 1/2016 | ....... | G06F 17/30247 |
| WO | WO 2019075338 | 4/2019 | | |

OTHER PUBLICATIONS

Ashlesh Sharma, The Fake vs Real Goods Problem: Microscopy and Machine Learning to the Rescue, KDD '17: Proceedings of the 23rd ACM SIGKDD International Conference on Knowledge Discovery and Data Mining Aug. 2017 pp. 2011-2019 https://doi.org/10.1145/3097983.3098186 (Year: 2017).*

Su, Po-Chyi; Wu, Chin-Song, "Efficient Copy Detection for Compressed Digital Videos by Spatial and Temporal Feature Extraction", Multimed Tools Appl (2017) 76: pp. 1331-1353.

* cited by examiner

Primary Examiner — Michael Young
(74) Attorney, Agent, or Firm — Thompson Hine LLP

(57) ABSTRACT

Various implementations manage an electronic asset by creating a representation of an electronic asset and its variants. This may be accomplished by identifying variants of an electronic asset, identifying a portion of a feature space associated with the asset and variants, and providing a representation corresponding to that portion of feature space. A fixed function classifier may be used to determine the points in the feature space for the electronic asset and its variants. The set of points produced for an asset and its variants using such a fixed function classifier will be near one another in feature space. Moreover, the area around such points will also represent points for other similar variations of the asset and thus, the portion of the feature space around the points can be considered the area of ownership for the electronic asset, e.g., it defines a boundary of what the creator is asserting is his or her creation.

26 Claims, 3 Drawing Sheets

ELECTRONIC ASSET MANAGEMENT

CROSS-REFERENCE TO RELATED APPLICATIONS

This Application claims the benefit of U.S. Provisional Application Ser. No. 62/881,613 filed Aug. 1, 2019, which is incorporated herein in its entirety.

TECHNICAL FIELD

The present disclosure generally relates to electronic assets, and in particular, to systems, methods, and devices for asserting and managing ownership over an electronic asset and its variants.

BACKGROUND

Computer devices are used to create, modify, send, receive, and store images, pictures, videos, three dimensional (3D) models, audio clips, and numerous other types of electronic assets. Existing systems do not adequately enable the creators of such electronic assets to assert ownership in their electronic assets and their variants that could be considered within the scope of their electronic assets. Existing systems do not adequately facilitate the identification of copying of electronic assets, control the licensed use of the electronic assets, or otherwise manage the ownership of electronic assets. Similarly, existing systems do not adequately enable users to check their electronic assets against subject matter that has already been claimed to be the creations of others.

SUMMARY

Various implementations disclosed herein include devices, systems, and methods that create a representation of ownership of an electronic asset and variants (e.g. similar variations) of the electronic asset. This is accomplished by identifying variants of an electronic asset automatically or based on user input, identifying a portion of a feature space associated with the asset and the variants, and providing a representation corresponding to that portion of feature space. Machine learning can be used to enhance this process, for example, by using a fixed function classifier to determine the points in the feature space for the electronic asset and its variants. Such a fixed function classifier can be trained to produce points near one another in the feature space for similar assets and more points distant from one another in the feature space for dissimilar assets. The set of points produced for an asset and its variants using such a fixed function classifier will be near one another in feature space. Moreover, the area around such points will also represent points for other similar variations of the asset and thus, the portion of the feature space around the points can be considered the area of ownership for the electronic asset, e.g., it defines a boundary of what the asset creator is asserting is his or her creation.

In some implementations, a method is performed at a device having a processor and a computer-readable storage medium, such as a server. The method involves identifying variants (e.g., derivatives and other similar variations) of an electronic asset. Examples of assets include, but are not limited to, images, pictures, videos, and sound clips, 3D models, and images or 3D models with metadata that identifies materials and textures. The variants may be automatically determined using, as examples, twists, rotations, scales, stretches, skews, resizes, re-colorings, texture changes, material changes, sub component scaling, substitutions, removals, mesh tessellations, mesh subdivisions, noise additions/removals, audio pitch changes, portion cut offs, etc.

The method further identifies points in a feature space for the electronic asset and the variants of the electronic asset. In some implementations, the feature space is an n dimensional mathematical space capable of representing every conceivable electronic asset as a combination of coordinates. A machine learning model such as a fixed function classifier may be used to determine a feature space point for the electronic asset and each of its variants. The machine learning model may be configured such that small variations in electronic assets lead to relatively close points in the feature space while large variations in electronic assets lead to relatively distant points in the feature space. In some implementations, a fixed function classifier is trained using a loss function that minimizes the distance between points in the feature space produced for similar inputs and maximizes the distance between points in the feature space produced for dissimilar inputs.

The method further provides a representation of a portion of the feature space (e.g., a token identifying a volume or portion) corresponding to the points in the feature space identified for the electronic assets and the variants of the electronic asset. The representation, e.g., token, can be considered an assertion of ownership, e.g., that the token owner has staked a claim as owning all electronic assets corresponding to points in the feature space within the portion identified. In some implementations, a token includes an identifier that references a database record that stores a feature manifold representing the portion of the feature space corresponding to the electronic asset. The token may include a digital signature that represents authorization from an authority, such as a business entity that manages the feature space or database. The database record may also identify the asset owner and other information about the electronic asset and thus facilitate sale, licensing, and other transactions.

Some implementations provide a method for checking an asset against a feature space to identify whether the asset corresponds to a point that is within an already-claimed portion of the feature space. The method is performed at a device having a processor and a computer-readable storage medium, such as a server. The method involves identifying a point in a feature space for an electronic asset, for example, using a machine learning model such as a fixed function classifier. The method then compares the point against portions of the feature space corresponding to already claimed electronic assets and their variants. For example, the comparing may involve determining that the point is within a portion of the feature space already claimed for a second electronic asset. Based on the comparing, output is provided. For example, an electronic asset owner may submit a third party's electronic asset and receive output identifying that the third party's electronic asset falls within the electronic asset owner's claimed portion or does not fall within the electronic asset owner's claimed portion.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
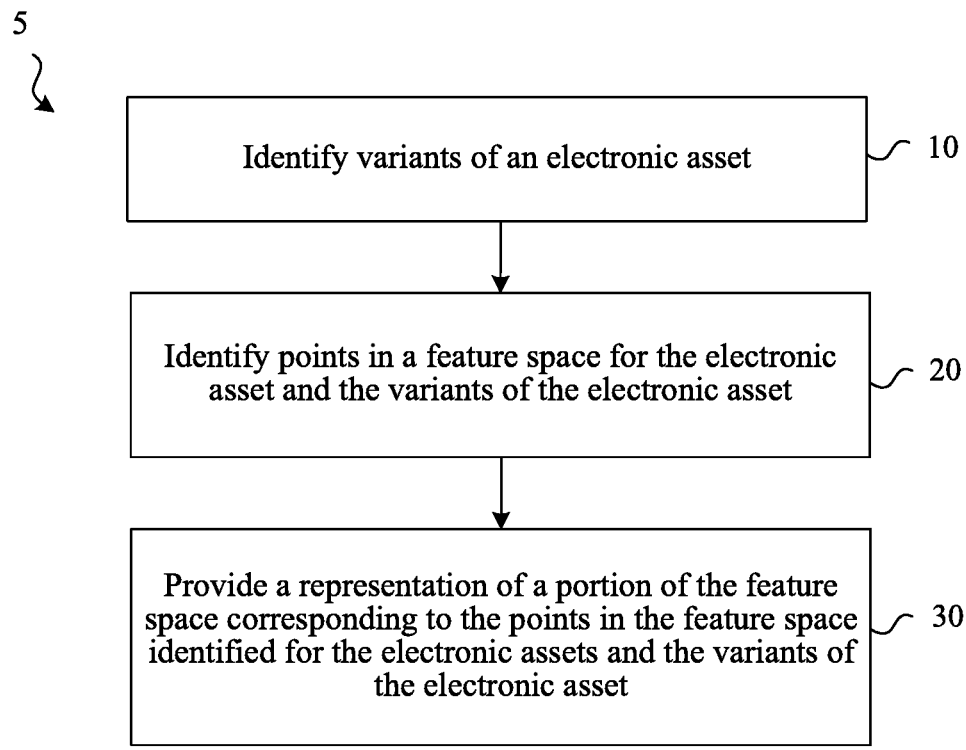
FIG. 1 is a flowchart of a method for creating a representation of ownership of an asset and variants of the asset, according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 is a flowchart of a method 5 for creating a representation of ownership of an asset and variants of the asset. In some implementations, the method 5 is performed by a device (e.g., device 500 of FIG. 5). The method 5 can be performed at a mobile device, desktop, laptop, or server device or via a combination of such devices. In some implementations, the method 5 is performed by processing logic, including hardware, firmware, software, or a combination thereof. In some implementations, the method 5 is performed by a processor executing code stored in a non-transitory computer-readable medium (e.g., a memory).

At block 10, the method identifies variants of an electronic asset. In some implementations, an automated variant process is performed that identifies variant-producing actions/types of transforms (e.g., twist, change texture, etc.), portions of the electronic asset to transform or fix without transformation (e.g., transform all, transform only the top, etc.), transform parameters (e.g., amount of twisting, type of texture change). The automated variant process performs the variant-producing actions accordingly to automatically produce the variants. Example variant producing actions include, but are not limited to, twists, rotations, scales, stretches, skews, resizes, recolorings, texture changes, material changes, sub-components scaling, substitutions, removals, mesh tessellations, mesh subdivisions, noise additions/removals, audio pitch changes, portion cut offs, etc.

In some implementations, the variant producing actions/types of transforms, transform parameters, or portions of the electronic asset to transform/fix are selected based on an asset type (e.g., image, 3D model, picture, audio clip, etc.), asset category (e.g., automobile, building, person, etc.), or complexity (e.g., less than 5 parts, more than 5 parts, etc.) of the electronic asset. In other implementations, user-input is additionally or alternatively used to identify or perform the variant-producing actions/transforms and to select the variant parameters or portions of the electronic asset to vary.

In some implementations, some portions (e.g., top versus bottom) of an electronic asset are varied more or less than other portions. The variable treatment of different portions may be determined automatically, based on type or category, or based on user input.

In some implementations, a user provides input providing examples of boundary variants. For example, where the asset is a mouse, the user may submit a variant with the ears having a minimum desired size and a variant with the ears having maximum desired size. In some implementations, a user interface automatically produces multiple variants (e.g., illustrating a spectrum of mice with features changes in different amounts), displays the multiple variants to the user, and receives input selecting variants that correspond to the desired boundaries of the electronic asset. Variants between the boundaries are then included, while variants outside of the boundaries are excluded.

In some implementations, the variants depend upon the feature space. In a very crowded portion of a feature space, only small variants may be used, while in a less crowded portion of a feature space, greater variants may be used. In some implementations, an initial set of variants are used and then are revised after determining that use of the initial set of variants results in overlap within the feature space with another electronic asset.

In some implementations, a user interface presents previews of the variants that are to be associated with an electronic asset before proceeding with the rest of method 5. The user interface may provide options for the user to go back and recreate different variants or to otherwise change the variants that will be associated with the electronic asset. In some implementations, all variants (or all variants generated using a particular type of transform (e.g., twisting)) are shown simultaneously on the user interface to improve the user's ability to envision the scope of the variants of the electronic asset. In some implementations, the user is able to save images, sounds, videos, or other content of the variants for later reference, e.g., when selling the electronic assets to a buyer at some point in the future.

At block 20, the method 5 identifies points in a feature space for the electronic asset and the variants of the electronic asset. In some implementations, the feature space is an n dimensional mathematical space capable of representing any electronic asset as a combination of coordinates. In some implementations, an asset-to-feature space point model is used. For example, a machine learning model such as a fixed function classifier may be used to determine points in feature space for the electronic asset and each of its variants. The machine learning model may be configured such that small variations in electronic assets lead to relatively close points in the feature space while large variations in electronic assets lead to relatively distant points in the feature space. In some implementations, a fixed function classifier is trained using a loss function that minimizes the distance between points in the feature space produced for similar inputs and maximizes the distance between points in the feature space produced for dissimilar inputs. In some implementations, an asset-to-feature space point model is selected and used based on the type, category, or complexity of the electronic asset.

At block 30, the method 5 provides a representation of a portion of the feature space corresponding to the points in the feature space identified for the electronic assets and the variants of the electronic asset. In some implementations, the representation is a feature manifold. In some implementations, the representation identifies a volume of the feature space, e.g., identifying a value or value range for each feature/dimension of the feature space. In some implementations, the representation is an identifier that identifies a separately stored description of the portion, e.g., an identifier of a database record. In some implementations, the representation is a token that represents an assertion of ownership, e.g., that the token owner has staked a claim as owning all items corresponding to points in the feature space within the portion. Such a token may include an identifier that uniquely identifies a database record that stores the feature manifold for the asset. Such database records may identify the asset owner and include other information about the creation, modification, variant-producing actions/transforms, ownership history, etc. of the electronic asset.

Figure 2:
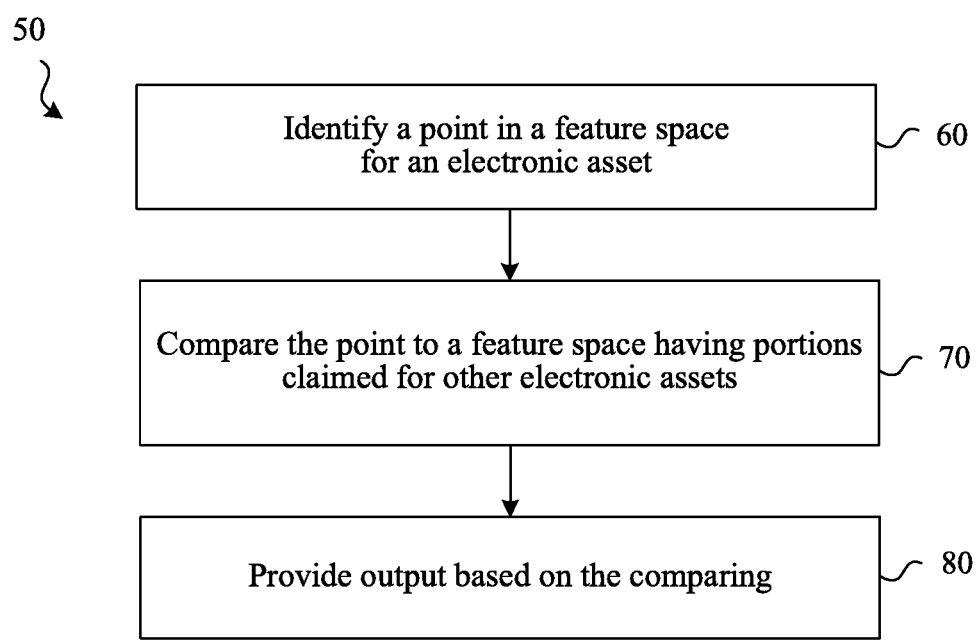
FIG. 2 is a flowchart representation of a method for checking an asset against a feature space to identify whether the asset is within an already-claimed portion of the feature space.

FIG. 2 is a flowchart representation of a method 50 for checking an asset against a feature space to identify whether the asset is within an already-claimed portion of the feature space. In some implementations, the method 50 is performed by a device (e.g., device 500 of FIG. 5). The method 50 can be performed at a mobile device, desktop, laptop, or server device or via a combination of such devices. In some implementations, the method 50 is performed by processing logic, including hardware, firmware, software, or a combination thereof. In some implementations, the method 50 is performed by a processor executing code stored in a non-transitory computer-readable medium (e.g., a memory). In some implementations, the method 50 is performed to validate ownership of an electronic asset.

At block 60, the method 50 identifies a point in a feature space for an electronic asset. The electronic asset may have been received from a user, for example, a user checking to determine if the electronic asset falls within the user's own asserted electronic assets or as part of a "freedom to use" search to determine if the electronic asset falls within anyone else's asserted electronic assets. In some implementations, the feature space is an n dimensional mathematical space capable of representing any electronic asset as a combination of coordinates. In some implementations, an asset-to-feature space point model is used. For example, a machine learning model such as a fixed function classifier may be used to determine a point in feature space for the electronic asset. The machine learning model may be configured such that small variations in electronic assets lead to relatively close points in the feature space while large variations in electronic assets lead to relatively distant points in the feature space. In some implementations, a fixed function classifier is trained using a loss function that minimizes the distance between points in the feature space produced for similar inputs and maximizes the distance between points in the feature space produced for dissimilar inputs. In some implementations, an asset-to-feature space point model (and thus a corresponding feature space) is selected and used based on the type, category, or complexity of the electronic asset. In some implementations, the same model can be used at block 60 as used at block 20.

At block 70, the method 50 compares the point to a feature space having portions claimed for other electronic assets. This may involve comparing the point to a portion of the feature space already claimed for a second electronic asset to determine if the point is inside or outside of a volume defined for the portion, how close the point is to the center of such a portion, how close the point is to an nearest edge of such a portion, a probability that the point will be within a volume defined for such a portion, or any other appropriate comparison. In one implementation, the comparing involves determining whether the point is within a volume of the feature space already claimed for a second asset (e.g., as determined at block 30 for another asset and its variants). In one implementation, the comparing involves determining a distance of the point to a center of the portion. In one implementation, the comparing involves determining a distance of the point to a second point identified for the second asset. In one implementation, the comparing involves the comparing involves determining a distance of the point to a nearest edge of the portion. In these examples, the portion of feature space corresponds to points in the feature space identified for the second electronic assets and variants of the second electronic asset. By comparing the point with the portion, the method 10 effectively determines or estimates how similar the point is to the portion.

At block 80, the method 50 provides output based on the comparing. For example, the output may indicate that the electronic asset is not within a portion corresponding to any other electronic assets, the identity of an electronic asset corresponding to a portion of the feature space that contains the point, a probability that the electronic asset corresponds to another electronic asset and its associated variants already claimed by another owner, and the like.

Figure 3:
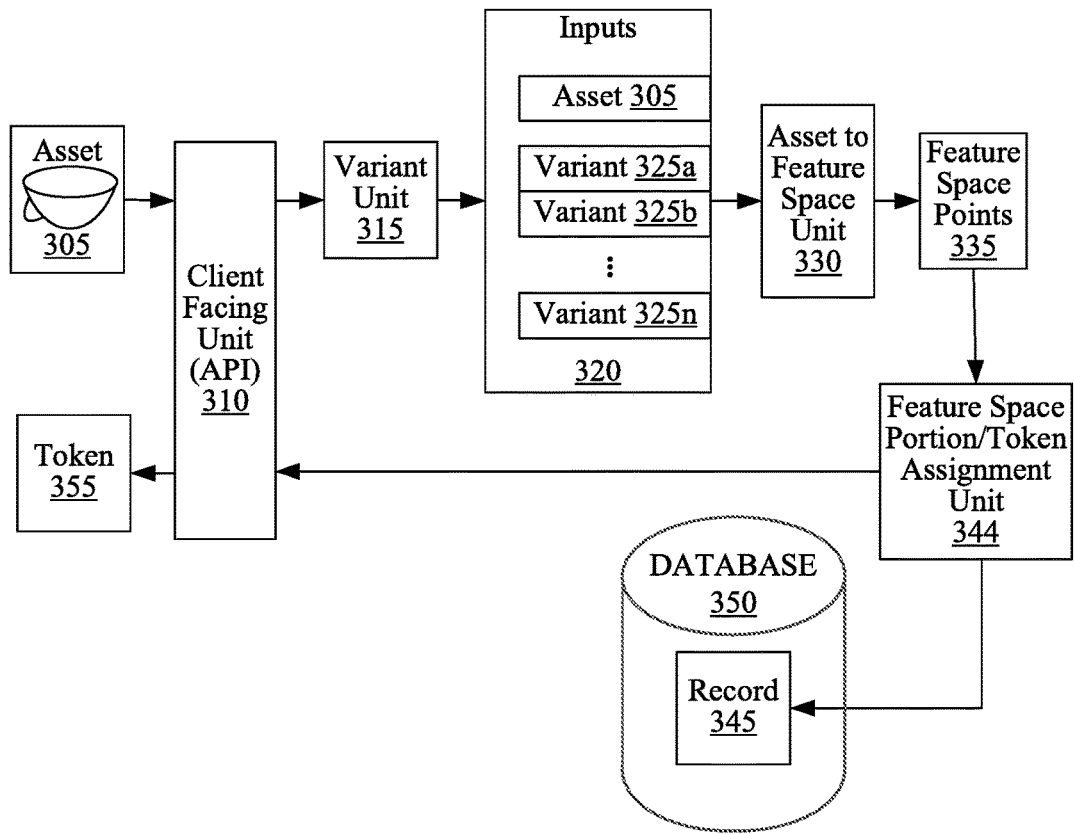
FIG. 3 is a process flow diagram of a method for creating a token representing ownership of an asset and similar variations of the asset, according to some implementations.

FIG. 3 is a process flow diagram of a method for creating a token representing ownership of an electronic asset its variants. In this example, an electronic asset 305 is submitted via a client facing unit (e.g., application programming interface (API)) 310. For example, a user may use a client application or webpage to upload the asset 305 via an electronics communication network. The client facing unit (API) 310 provides the asset 305 to a variant unit 315.

The variant unit 315 creates variants 325*a-n* via variant producing actions/transforms, for example, as discussed with respect to block 10 of FIG. 1. The electronic asset 305 and the variants 325*a-n* are provided as inputs 320 to asset-to-feature space unit 330. The asset-to-feature space unit 330 identifies feature space points 335 for the asset 305 and the variants 325*a-n*, for example, as discussed with respect to block 20 FIG. 1.

The feature space points 335 are provided to feature space portion/token assignment unit 344. The feature space portion/token assignment unit 344 identifies a portion of the feature space that surrounds or otherwise encompasses the feature space points 335.

Figure 4:
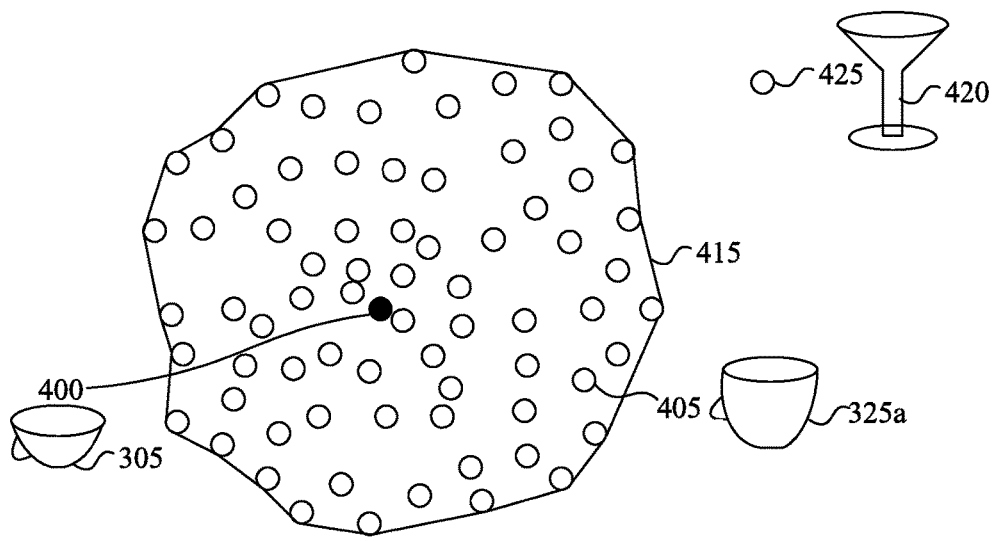
FIG. 4 is a block diagram illustrating points corresponding to assets and variants in an illustrative two dimensional (2D) feature space.

FIG. 4 is a block diagram illustrating points corresponding to an asset and variants in an illustrative two dimensional (2D) feature space. Generally, the feature space will include tens, hundreds, thousands, tens of thousands or more feature dimensions. However, for the purpose of illustration, FIG. 2 illustrates using a 2D feature space. The exemplary encompassing/surrounding technique can be extended to higher dimensional spaces or alternative techniques may be used. In the example of FIG. 4, points correspond to the asset 305 and variants 325a-n (e.g., point 400 corresponds to the electronic asset 305, point 405 corresponds to the variant 325a, etc.). Additional point labels are omitted to avoid obscuring the Figure. In this example, the feature space portion/token assignment unit 344 identifies an area (e.g., a volume in greater dimensions) of the feature space that includes all of the points corresponding to the asset 305 and the variants 325a-n. In this example, the area is represented by the boundary 415. Assets corresponding to points within the area of boundary 415 are considered within the claimed electronic asset. Assets corresponding to points outside of the area of boundary 415 are considered outside of the claimed electronic asset. For example, asset 420 corresponds to point 425, which is outside of the area of boundary 415, and thus is not considered within the claimed electronic asset.

Returning to FIG. 3, after the feature space portion/token assignment unit 344 identifies a portion of the feature space that surrounds or otherwise encompasses the feature space points 335, the feature space portion/token assignment unit 344 creates a representation of the portion. In some implementations, the representation is a token 355 that identifies the portion or includes an identifier that can be used to access an identifier of the portion. In this example, the feature space portion/token assignment unit 344 creates a token 355 that uniquely identifies a database record 345 of a database 350. The database record 345 specifies the portion/volume of the feature space corresponding to the electronic asset. The token 355 is then returned to the user via the client facing unit (API) 310.

The database 350 may include records for many electronic assets and may be referenced to determine whether an electronic asset falls within portions of the feature space corresponding to any of the electronic assets for which records are stored. The database 350 may be updated upon the creation of new electronic assets with new records. The database may additionally include references identifying the owner of an electronic asset, licensee(s) authorized by the owner to use the electronic asset, sales of the electronic asset, creation data (e.g., date, time, creating user, transform details, etc.), modification data, and other information relevant to ownership of the electronic asset.

Figure 5:
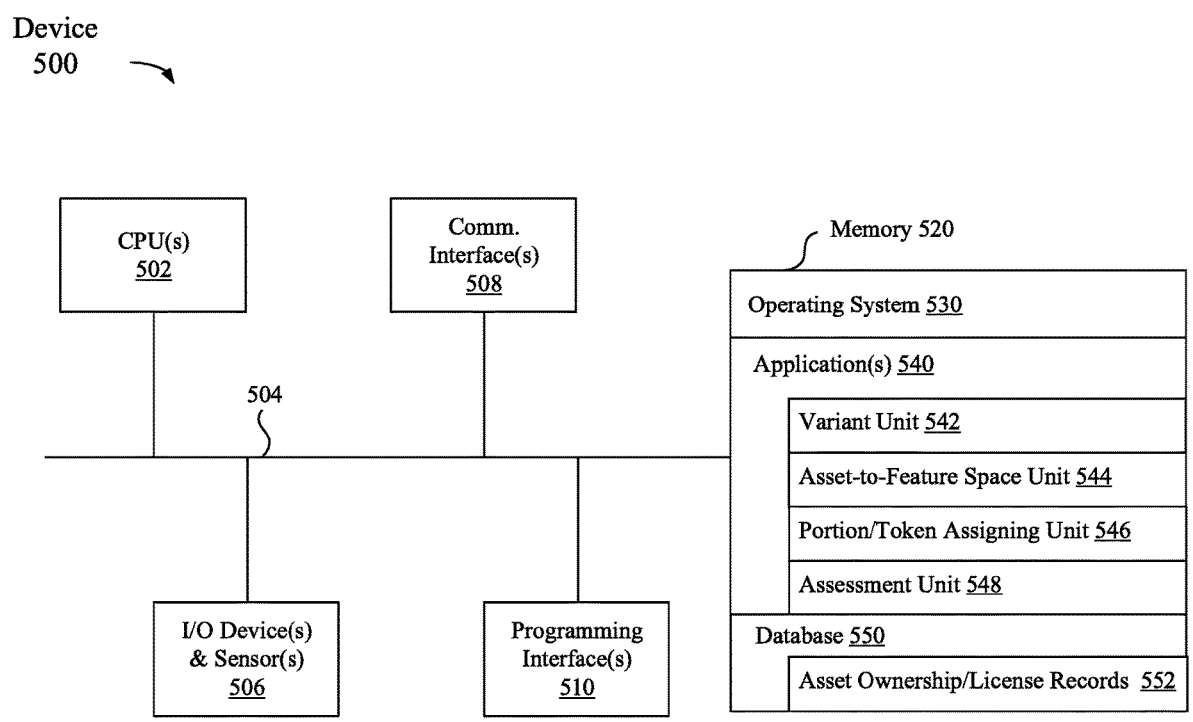
FIG. 5 is a block diagram of an example system in which aspects of the present disclosure may be implemented.

FIG. 5 is a block diagram illustrating device components of a device 500 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the first device 500 includes one or more processing units 502 (e.g., microprocessors, ASICs, FPGAs, GPUs, CPUs, processing cores, or the like), one or more input/output (I/O) devices and sensors 506, one or more communication interfaces 508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 510, a memory 520, and one or more communication buses 504 for interconnecting these and various other components. In some implementations, the one or more communication buses 504 include circuitry that interconnects and controls communications between system components.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530, one or more applications 540, and database 550. The operating system 530 includes procedures for handling various basic system services and for performing hardware dependent tasks.

In various implementations, the one or more applications 540 include a variant unit 542, an asset-to-feature space unit 544, a portion/token assigning unit 546, and an assessment unit 548. The variant unit 548 is configured to produce variants of electronic assets, for example, using one or more of the techniques discussed with respect to block 10 of FIG. 1. The asset-to-feature space unit 544 is configured to produce points in feature space for an electronic asset and its variants, for example, using one or more of the techniques discussed with respect to block 20 of FIG. 1. The portion/token assigning unit 546 is configured to identify a volume or other portion of a feature space corresponding to the points of an asset and its variants, for example, using one or more of the techniques discussed with respect to block 30 of FIG. 1. The assessment unit 548 is configured to compare how similar an electronic asset is to other electronic assets/variants claimed by electronic asset owners, for example, using the techniques discussed with respect to FIG. 2.

FIG. 5 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A non-transitory computer-readable storage medium, storing program instructions executable on a device to perform operations comprising: identifying, via a variant unit, variants of an electronic asset, wherein the variants are determined by applying modifications to portions of the electronic asset such that the variants are similar to the electronic asset but differ from the electronic asset based on the modifications; identifying, via an asset-to-feature space unit, points in a feature space for the electronic asset and the variants of the electronic asset, wherein the points are identified by applying a machine learning model such that distances of the points from one another in the feature space corresponds to magnitudes of variation amongst the asset and the variants; and providing, via an assigning unit, a representation of a portion of the feature space defined by a boundary around both the points in the feature space identified for the electronic asset and the points in the feature space identified for the variants of the electronic asset, the boundary defining what is asserted to be owned by a content creator or content owner, wherein the representation comprises a token representing an assertion of ownership by the content creator or content owner in all electronic assets corresponding to points within the boundary.

2. The non-transitory computer-readable storage medium of claim 1, wherein the feature space is an n dimensional mathematical space capable of uniquely representing electronic assets as a combination of coordinates.

3. The non-transitory computer-readable storage medium of claim 1, wherein identifying the points comprises applying a fixed function classifier.

4. The non-transitory computer-readable storage medium of claim 3, wherein the fixed function classifier is configured such that small variations in assets correspond to relatively close points in the feature space while large variations in assets correspond to relatively distant points in the feature space.

5. The non-transitory computer-readable storage medium of claim 3, wherein the fixed function classifier was trained via machine learning using a loss function that minimizes distance of points in the feature space produced for similar inputs and maximizes distance of points in the feature space produced for dissimilar inputs.

6. The non-transitory computer-readable storage medium of claim 1, wherein the operations further comprise identifying an asset-to-feature space point model to use to identify the points based on a category, type, or complexity of the electronic asset.

7. The non-transitory computer-readable storage medium of claim 1, wherein identifying the variants of the electronic asset comprises automatically performing a transform on the electronic asset to produce a variant.

8. The non-transitory computer-readable storage medium of claim 7, wherein the transform comprises a twist, a rotation, a stretch, a scale, a skew, a resize, a recoloring, a texture change, a material change, a sub-components scaling, a substitution, a removal, a mesh tessellation, a mesh subdivision, a noise addition, a noise removal, an audio pitch change, cutting off a part, or adding a part.

9. The non-transitory computer-readable storage medium of claim 7, wherein the transform is determined based on a category, type, or complexity of the electronic asset.

10. The non-transitory computer-readable storage medium of claim 7, wherein the transform is determined based on user input specifying: a type of transform; a transform parameter; a portion of the electronic asset to transform; a portion of the asset to fix without transformation; or an amount of transformation.

11. The non-transitory computer-readable storage medium of claim 1, wherein the token comprises an identifier of a database record that stores a feature manifold corresponding to the portion of the feature space, wherein the database record identifies a person or entity claiming ownership of the electronic asset and all variations corresponding to points in the feature space within the portion.

12. A non-transitory computer-readable storage medium, storing program instructions executable on a device to perform operations comprising: identifying a point in a feature space for an electronic asset; comparing the point to a boundary defining a portion of the feature space already claimed for a second electronic asset, wherein the portion of feature space is represented by a representation generated by: identifying, via an asset-to-feature space unit, points in the feature space for the second electronic asset and variants of the electronic asset, wherein the points are identified by applying a machine learning model such that distances of the points from one another in the feature space corresponds to magnitudes of variation amongst the second electronic asset and the variants; and providing, via an assigning unit, a representation of the portion of the feature space defined by the boundary around both the points in the feature space identified for the second electronic asset and the points in the feature space identified for the variants of the second electronic asset, wherein the representation corresponds to an assertion of ownership in the second electronic asset and all variations corresponding to points within the portion of the feature space, the boundary defining what is asserted to be owned by a content creator or content owner, wherein the representation comprises a token representing an assertion of ownership by the content creator or content owner in all electronic assets corresponding to points within the boundary; and providing output based on the comparing, the output identifying whether the electronic asset is owned by the content creator or content owner.

13. The non-transitory computer-readable storage medium of claim 12, wherein the representation comprises a digital signature representing authorization from an authority that manages the feature space or database.

14. The non-transitory computer-readable storage medium of claim 12, wherein the operations further comprise initiating a sale of the electronic asset or license to use the electronic asset based on determining that the electronic asset is owned by the person or entity claiming ownership in the second electronic asset and all variations corresponding to points within the portion of the feature space.

15. The non-transitory computer-readable storage medium of claim 12, wherein the comparing is initiated by a third party separate from the person or entity claiming ownership in the second electronic asset and all variations corresponding to points within the portion of the feature space.

16. The non-transitory computer-readable storage medium of claim 15, wherein the output is provided to the third party and identifies that the electronic asset is owned by the person or entity claiming ownership in the second electronic asset and all variations corresponding to points within the portion of the feature space.

17. The non-transitory computer-readable storage medium of claim 15, wherein the output is provided to the third party and identifies that the electronic asset is not owned by another person or entity.

18. The non-transitory computer-readable storage medium of claim 17, wherein the operations further comprise generating a representation of ownership in the electronic asset and variants thereof, wherein the representation identifies that the electronic asset and all variations within a second portion of the feature space are owned by the third party.

19. The non-transitory computer-readable storage medium of claim 12, wherein the database further identifies: licensees authorized by the person or entity claiming ownership in the second electronic asset and all variations corresponding to points within the portion of the feature space; sales of second electronic asset or variations corresponding to points within the portion of the feature sp ace; and modifications of the second electronic asset or variations corresponding to points within the portion of the feature space.

20. The non-transitory computer-readable storage medium of claim 12, wherein the comparing comprises: determining whether the point is within a volume of the feature space already claimed for a second asset; determining a distance of the point to a center of the portion; determining a distance of the point to a second point identified for the second asset; or determining a distance of the point to a nearest edge of the portion.

21. The non-transitory computer-readable storage medium of claim 12, wherein the output is a probability that the electronic asset corresponds to subject matter already claimed by an owner of a second asset.

22. A system comprising: a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising: identifying, via a variant unit, variants of an electronic asset, wherein the variants are determined by applying modifications to portions of the electronic asset such that the variants are similar to the electronic asset but differ from the electronic asset based on the modifications; identifying, via an asset-to-feature space unit, points in a feature space for the electronic asset and the variants of the electronic asset, wherein the points are identified by applying a machine learning model such that distances of the points from one another in the feature space corresponds to magnitudes of variation amongst the asset and the variants; and providing, via an assigning unit, a representation of a portion of the feature space defined by a boundary around both the points in the feature space identified for the electronic asset and the points in the feature space identified for the variants of the electronic asset, the boundary defining what is asserted to be owned by a content creator or content owner, wherein the representation comprises a token representing an assertion of ownership by the content creator or content owner in all electronic assets corresponding to points within the boundary.

23. The system of claim 22, wherein identifying the points comprises applying a fixed function classifier.

24. The system of claim 23, wherein the fixed function classifier is configured such that small variations in assets correspond to relatively close points in the feature space while large variations in assets correspond to relatively distant points in the feature space.

25. The system of claim 22, wherein identifying the variants of the electronic asset comprises automatically performing a transform on the electronic asset to produce a variant.

26. The system of claim 25, wherein the transform comprises a twist, a rotation, a stretch, a scale, a skew, a resize, a recoloring, a texture change, a material change, a subcomponents scaling, a substitution, a removal, a mesh tessellation, a mesh subdivision, a noise addition, a noise removal, an audio pitch change, cutting off a part, or adding a part.

* * * * *

UNITED STATES PATENT AND TRADEMARK OFFICE
CERTIFICATE OF CORRECTION

| | | |
|---|---|---|
| PATENT NO. | : 12,094,019 B1 | Page 1 of 1 |
| APPLICATION NO. | : 16/944812 | |
| DATED | : September 17, 2024 | |
| INVENTOR(S) | : Jack R. Greasley, Daniel Ulbricht and Eshan Verma | |

It is certified that error appears in the above-identified patent and that said Letters Patent is hereby corrected as shown below:

In the Claims

Claim 19, Column 12, Line 28 reads:
"... to points within the portion of the feature sp ace; ..."
Should read:
--... to points within the portion of the feature space; ...--

Signed and Sealed this
Fifteenth Day of October, 2024

Katherine Kelly Vidal
*Director of the United States Patent and Trademark Office*